US012682271B2

(12) United States Patent
Heo et al.

(10) Patent No.: US 12,682,271 B2
(45) Date of Patent: Jul. 14, 2026

(54) METHOD FOR SEARCHING MINIMUM

(71) Applicant: Korea University Research and Business Foundation, Seoul (KR)

(72) Inventors: Jun Heo, Seoul (KR); Yujin Kang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 1036 days.

(21) Appl. No.: 17/559,514

(22) Filed: Dec. 22, 2021

(65) Prior Publication Data

US 2023/0044487 A1 Feb. 9, 2023

(30) Foreign Application Priority Data

Aug. 6, 2021 (KR) ........................ 10-2021-0103746

(51) Int. Cl.
*G06N 10/60* (2022.01)
*G06N 10/20* (2022.01)
(52) U.S. Cl.
CPC ............. *G06N 10/60* (2022.01); *G06N 10/20* (2022.01)
(58) Field of Classification Search
CPC ........ G06N 10/00; G06N 10/20; G06N 10/60; G06N 10/40; G06N 10/70; G06N 10/80; G06F 18/24147; G06F 16/2228; G06F 9/44505; G06F 17/16; B82Y 10/00; H04L 47/527; H04W 72/563; H04W 72/23; H04W 72/0453
See application file for complete search history.

(56) References Cited

U.S. PATENT DOCUMENTS

| | | | |
|---|---|---|---|
| 7,028,275 B1 | 4/2006 | Chen et al. | |
| 11,514,209 B1 * | 11/2022 | Fernandes Ramos . | G06N 10/00 |
| 11,728,011 B2 * | 8/2023 | Tavernelli .............. | G06N 10/60 |
| | | | 703/12 |
| 2007/0288684 A1 * | 12/2007 | Bergou .................. | G06N 10/20 |
| | | | 711/101 |

(Continued)

FOREIGN PATENT DOCUMENTS

| | | | | |
|---|---|---|---|---|
| CN | 1672171 A | * | 9/2005 | ............. B82Y 10/00 |
| CN | 106650808 A | * | 5/2017 | ....... G06F 18/24147 |

(Continued)

OTHER PUBLICATIONS https://en.wikipedia.org/w/index.php?title=Quantum_memory&oldid=963183747 Edit version 2020 (Year: 2020).*

(Continued)

*Primary Examiner* — Steven P Sax
(74) *Attorney, Agent, or Firm* — NSIP Law

(57) ABSTRACT

Disclosed is a minimum searching method for searching a minimum in N (N is a natural number) data by a computing device including at least one processor. The method for searching the minimum may include: determining a threshold; initializing Qubits to include indexes representing addresses in which the N data are recorded, respectively, and the threshold in a superposition state; returning, from a superposition-state index, superposition-state data corresponding to the superposition-state index through a quantum memory; comparing the superposition-state data with the threshold in parallel through a quantum comparator (Q-comp); and searching the minimum based on the comparison result.

16 Claims, 8 Drawing Sheets

(56) References Cited

U.S. PATENT DOCUMENTS

| | | | | |
|---|---|---|---|---|
| 2016/0314406 A1* | 10/2016 | Wiebe | ............... | G06F 18/24147 |
| 2016/0328253 A1* | 11/2016 | Majumdar | ............. | G06N 10/80 |
| 2017/0286858 A1* | 10/2017 | La Cour | ................. | G06N 10/80 |
| 2019/0220497 A1* | 7/2019 | Wiebe | .................... | G06N 10/60 |
| 2022/0050873 A1* | 2/2022 | Gilliam | ................. | G06N 10/60 |
| 2022/0188679 A1* | 6/2022 | Mazzola | ................ | G06Q 40/04 |
| 2022/0300843 A1* | 9/2022 | Rahmes | ................... | G06N 3/09 |

FOREIGN PATENT DOCUMENTS

| | | | | | |
|---|---|---|---|---|---|
| CN | 110543482 | A | * | 12/2019 | ........ G06F 16/2228 |
| CN | 111291892 | A | * | 6/2020 | ............. G06N 10/00 |
| CN | 112182494 | A | * | 1/2021 | ............. B82Y 10/00 |
| CN | 112258543 | A | * | 1/2021 | ............. G06T 7/136 |
| CN | 112966456 | A | * | 6/2021 | ............. G06F 30/30 |
| CN | 113012080 | A | * | 6/2021 | ............. G06N 3/045 |
| CN | 110162536 | B | * | 7/2021 | ........... G06F 16/242 |
| CN | 111291892 | B | * | 1/2023 | ............. G06N 10/00 |
| CN | 111832734 | B | * | 10/2023 | ............. G06N 10/00 |
| CN | 118710430 | A | * | 9/2024 | ............. G06N 10/60 |
| EP | 3570223 | A1 | * | 11/2019 | ............. G06F 16/22 |
| EP | 3757910 | A1 | * | 12/2020 | ............. G06F 17/16 |
| JP | 2005-78407 | A | | 3/2005 | |
| JP | 4718190 | B2 | * | 7/2011 | |
| JP | 7525235 | B2 | * | 7/2024 | ............. G06N 10/20 |
| KR | 10-0350233 | B1 | | 8/2002 | |
| KR | 20220160418 | A | * | 12/2022 | |
| WO | WO-2015085190 | A2 | * | 6/2015 | ........ G06F 9/44505 |
| WO | WO-2020263146 | A1 | * | 12/2020 | ............. G06N 10/60 |
| WO | WO-2022079723 | A1 | * | 4/2022 | ............. G06N 10/60 |

OTHER PUBLICATIONS

Kang, Yujin et al. "Quantum Minimum Searching Algorithm and Circuit Implementation" *International Conference on Information and Communication Technology Convergence (ICTC)*. IEEE, 2020. (6 pages in English).

Chen, Yanhu et al., "A low failure rate quantum algorithm for searching maximum or minimum." Quantum Information Processing 19.8 (2020): 270, Jul. 29, 2020. (pp. 1-28).

Giovannetti, Vittorio et al., "Quantum random access memory." Physical review letters 100.16 (2008): 160501, Apr. 21, 2008. (pp. 1-4).

Haner, Thomas et al., "Factoring using 2n+2 qubits with Toffoli based modular multiplication", arXiv:1611.07995v2 [quant-ph], Jun. 1, 2017. (pp. 1-12). <URL: https://arxiv.org/abs/1611.07995>.

Korean Office Action issued on Jun. 17, 2024, in counterpart Korean Patent Application No. 10-2021-0103746 (8 pages in Korean).

* cited by examiner

FIG. 2

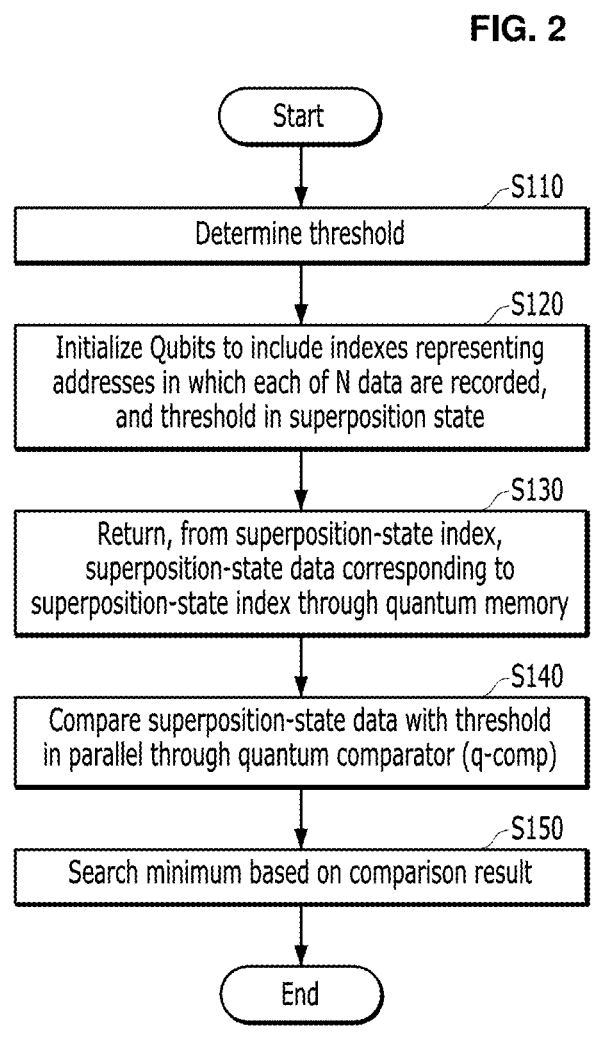

```
                    ┌─────────┐
                    │  Start  │
                    └─────────┘
                         │
                         ▼              ⌐S110
        ┌──────────────────────────────────────┐
        │          Determine threshold          │
        └──────────────────────────────────────┘
                         │
                         ▼              ⌐S120
        ┌──────────────────────────────────────┐
        │  Initialize Qubits to include indexes │
        │    representing addresses in which    │
        │   each of N data are recorded, and    │
        │   threshold in superposition state    │
        └──────────────────────────────────────┘
                         │
                         ▼              ⌐S130
        ┌──────────────────────────────────────┐
        │    Return, from superposition-state   │
        │   index, superposition-state data     │
        │   corresponding to superposition-     │
        │   state index through quantum memory  │
        └──────────────────────────────────────┘
                         │
                         ▼              ⌐S140
        ┌──────────────────────────────────────┐
        │  Compare superposition-state data     │
        │  with threshold in parallel through   │
        │      quantum comparator (q-comp)      │
        └──────────────────────────────────────┘
                         │
                         ▼              ⌐S150
        ┌──────────────────────────────────────┐
        │  Search minimum based on comparison   │
        │                result                 │
        └──────────────────────────────────────┘
                         │
                         ▼
                    ┌─────────┐
                    │   End   │
                    └─────────┘
```

FIG. 5

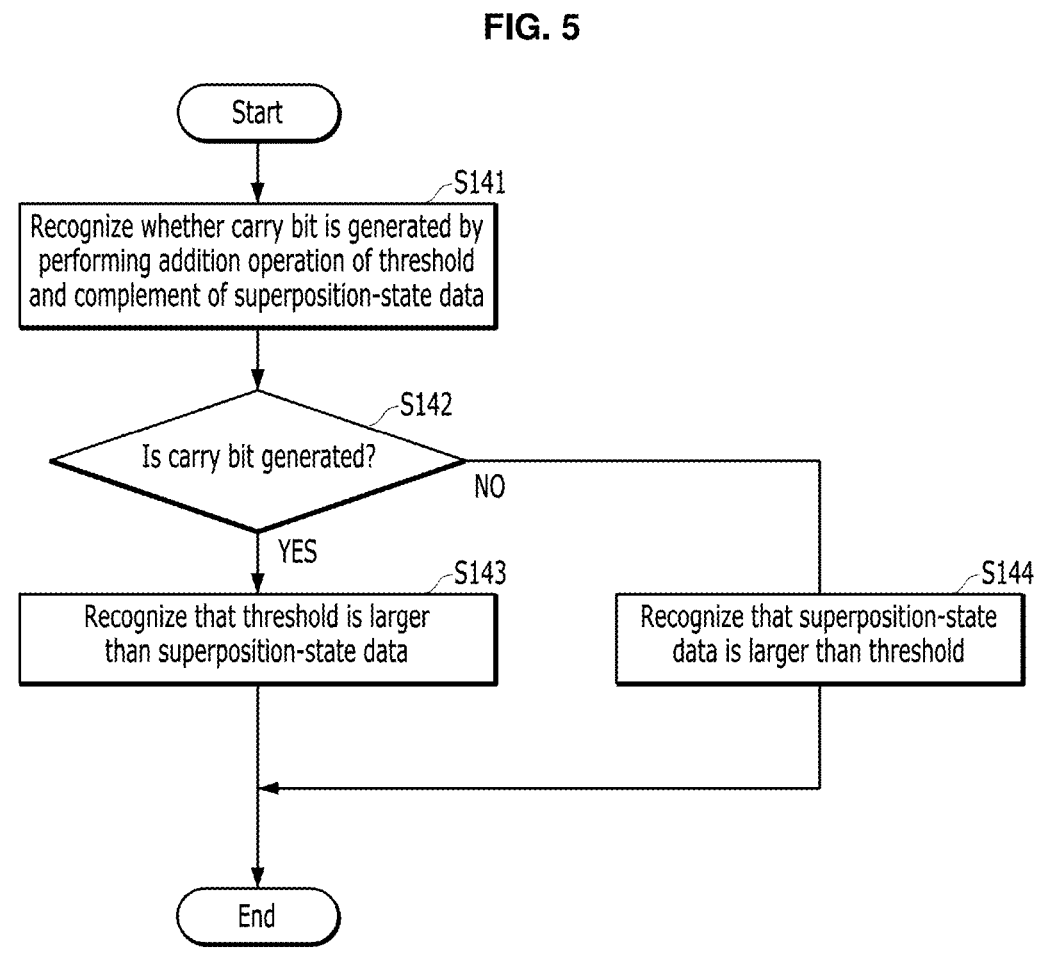

Start

S141
Recognize whether carry bit is generated by performing addition operation of threshold and complement of superposition-state data S142
Is carry bit generated?

NO

YES

S143
Recognize that threshold is larger than superposition-state data

S144
Recognize that superposition-state data is larger than threshold

End (RELATED ART)

| 5-qubit Simulation result | | | |
|---|---|---|---|
| Total umber of trials | Expected number of iterations | Failure rate (%) | Backend type |
| 500 | 57 | 0.8 | qasm simulator |

METHOD FOR SEARCHING MINIMUM

CROSS-REFERENCE TO RELATED APPLICATIONS

This application claims the benefit under 35 USC 119(a) and 365(b) of Korean Patent Application No. 10-2021-0103746 filed in the Korean Intellectual Property Office on Aug. 6, 2021, the entire contents of which are incorporated herein by reference.

TECHNICAL FIELD

The present disclosure relates to search algorithm implementation for a quantum computer, and particularly, to a method for implementing a quantum minimum searching algorithm (QMSA) by using a quantum RAM (QRAM) and a quantum comparator (Q-comp).

This research was conducted as a part of information and communication broadcasting research development project of the Ministry of Science and ICT and the Institute of Information and Communications Technology Planning Evaluation. (2010-0-01810, ultra-reliable quantum Internet element technological development connecting quantum world).

This research was conducted as a research result of a university ICT research center support project of the Ministry of Science and ICT and the Institute of Information and Communications Technology Planning Evaluation (IITP-2020-2018-0-01402).

BACKGROUND ART

A quantum computer may be a device that processes data by utilizing a quantum mechanics phenomenon such as entanglement or superposition. The quantum computer is expected to be able to exhibit more excellent performance than a classical computer, and active development is being made. However, the quantum computer is slightly different from the classical computer in a driving scheme, and an algorithm for solving a substantial problem also needs to be newly developed.

As a representative algorithm which may be used in the quantum computer, there is Grover Search Algorithm proposed by Lov Grover in 1996. Here, the Grover Search Algorithm as an algorithm for finding specific data in a database which is not aligned may be an algorithm having lower complexity than a classical random search algorithm. However, in the case of the Grover Search Algorithm and other current quantum algorithms, in a part comparing data, a part requiring a classical memory, i.e., a random access memory (RAM) may be present.

SUMMARY OF THE INVENTION

The present disclosure has been made in an effort to provide a method for searching a minimum by using a quantum computer replacing a part requiring a classical memory with a quantum memory.

However, technical objects of the present disclosure are not restricted to the technical object mentioned as above. Other unmentioned technical objects will be apparently appreciated by those skilled in the art by referencing to the following description.

An exemplary embodiment of the present disclosure provides a minimum searching method for searching a minimum in N (N is a natural number) data by a computing device including at least one processor. The method for searching the minimum may include: determining a threshold, initializing Qubits to include indexes representing addresses in which each of N data are recorded, and the threshold in a superposition state, returning, from a superposition-state index, superposition-state data corresponding to the superposition-state index through a quantum memory, comparing the superposition-state data with the threshold in parallel through a quantum comparator (Q-comp), and searching the minimum based on the comparison result.

The searching the minimum based on the comparison result may include repeatedly performing an operation of writing an index related to data smaller than the threshold in a database, inverting a phase of a written state, and amplifying a probability of the written state through a Grover operator at a predetermined number of times, returning an index measured as the repeated performing result, updating the threshold by using the returned index related data when the returned index related data is smaller than the threshold, and repeatedly performing the minimum searching method by using the updated threshold.

The searching the minimum based on the comparison result may include repeatedly performing an operation of writing an index related to data smaller than the threshold in a database, inverting a phase of a written state, and amplifying a probability of the written state through a Grover operator at a predetermined number of times, returning an index measured as the repeated performing result, and repeatedly performing the minimum searching method by using the threshold when the returned index related data is larger than the threshold.

The method may further include repeatedly performing the minimum searching method for a predetermined time $\tau_{th}$.

The predetermined time $\tau_{th}$ may be determined according to an equation $\tau_{th}=1.25\pi\sqrt{N}+1.4(\log_2 N)^2$.

The method may further include: returning the measured index when repeatedly performing the minimum searching method for the predetermined time $\tau_{th}$; and determining the returned index related data as the minimum when the returned index related data is smaller than the threshold.

The method may further include: returning the measured index when repeatedly performing the minimum searching method for the predetermined time $\tau_{th}$; and determining the threshold related data as the minimum when the returned index related data is larger than the threshold.

The determining a threshold may include determining any one of the N data as the threshold.

The predetermined number of times may be determined according to an equation $O(\sqrt{N})$, and the O may be a function representing time complexity according to an asymptotic notation.

The repeatedly performing an operation of writing an index related to data smaller than the threshold in a database, inverting a phase of a written state, and amplifying a probability of the written state through a Grover operator at a predetermined number of times, based on the comparison result may include amplifying a probability of a state having an amplitude smaller than an average amplitude.

The comparing the superposition-state data with the threshold in parallel through a quantum comparator (Q-comp) may include recognizing whether a carry bit is generated by performing an addition operation of the threshold and a complement of the superposition-state data, and comparing sizes of the superposition-state data and the threshold based on whether the carry bit is generated.

The comparing sizes of the superposition-state data and the threshold based on whether the carry bit is generated may include recognizing that the threshold is larger than the superposition-state data when it is recognized that the carry bit is generated.

The comparing sizes of the superposition-state data and the threshold based on whether the carry bit is generated may include recognizing that the superposition-state data is larger than the threshold when it is recognized that the carry bit is not generated.

Technical solving means which can be obtained in the present disclosure are not limited to the aforementioned solving means and other unmentioned solving means will be clearly understood by those skilled in the art from the following description.

According to some exemplary embodiments of the present disclosure, a part comparing current data is replaced with a quantum memory and a quantum comparator to search a minimum with lower complexity.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

FIG. 2 is a flowchart for describing an example of a method for searching a minimum in N data by a computing device according to some exemplary embodiments of the present disclosure.

FIG. 5 is a flowchart for describing an example of a method for comparing data of a superimposed state with a threshold in parallel by a computing device according to some exemplary embodiments of the present disclosure.

DETAILED DESCRIPTION

Figure 1:
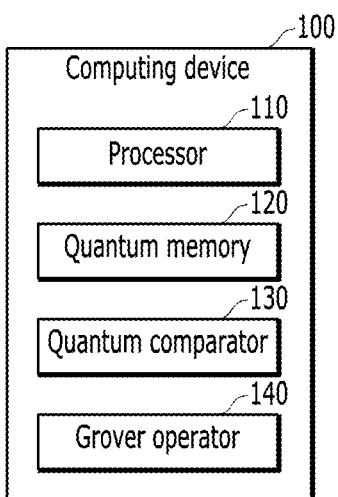
FIG. 1 is a block diagram for describing an example of a computing device according to some exemplary embodiments of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, the accompanying drawings are only for easily understanding the exemplary embodiment disclosed in this specification and the technical spirit disclosed by this specification is not limited by the accompanying drawings.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

Further, the terms "information" and "data" used in the specification may also be often used to be exchanged with each other.

It should be understood that, when it is described that a component is "connected to" or "accesses" another component, the component may be directly connected to or access the other component or a third component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

In a method for searching a minimum according to the present disclosure, as a part comparing a threshold and current data is implemented through a quantum memory (or quantum random access memory (QRAM) and a quantum comparator (Q-comp), the minimum may be searched with lower complexity. Here, the quantum memory may serve as an interface between classical data and quantum-state data. Specifically, when the quantum memory receives a superimposed state address, it may be possible to return corresponding superimposed-state data. The superposition state may mean that various states simultaneously represent one datum. In this case, the quantum comparator may perform a comparison for all superimposed-state data called through the quantum memory in parallel. Hereinafter, a method for searching a minimum according to the present disclosure will be described through FIGS. 1 to 8.

FIG. 1 is a block diagram for describing an example of a computing device according to some exemplary embodiments of the present disclosure.

Referring to FIG. 1, a computing device 100 may include a processor 110, a quantum memory 120, a quantum comparator 130 and a Grover operator 140. However, components described above are not required in implementing the computing device 100, so the quantum computing device 100 may have components more or less than components listed above.

The computing device 100 may be a quantum computing device capable of performing a quantum operation required for searching the minimum. However, the present disclosure is not limited thereto.

In the present disclosure, the computing device 100 may include the quantum memory 120 instead of the classical memory, and further, may include the quantum comparator 130 instead of the classical comparator.

Specifically, after Grover proposes a search algorithm which may be used by the quantum computer, a quantum algorithm for finding the minimum is proposed by Durr and Høyer. However, the algorithm for finding the minimum proposed by Durr and Høyer requires the classical comparator in a part comparing the data and the threshold. On the contrary, the computing device 100 according to the present disclosure includes the quantum memory 120 and the quantum comparator 130 to perform the part comparing the data and the threshold through the quantum memory 120 and the quantum comparator 130. That is, a part of which operation is required in the classical computer is replaced with an operation through a quantum circuit to modularize all processes of the method for searching the minimum into one computing device 100. However, the present disclosure is not limited thereto.

Meanwhile, the processor 110 may generally control an overall operation of the computing device 100. The processor 110 processes a signal, data, information, and the like input or output through the components or drives the application program stored in a database (not illustrated) to provide or process information or a function appropriate for the user.

In the present disclosure, the processor 110 may initialize a Qubit to include indexes and thresholds representing addresses in which N (N is a natural number) data are recorded, respectively in a superposition state. Here, N data may be data which becomes a target to search the minimum. The Qubit as a basic unit of the quantum computer may be a unit corresponding to a bit of the classical computer. The classical computer may process and store information by a bit unit of 0 and 1, while the quantum computer may process and store information by a Qubit unit simultaneously having states of 0 and 1. In addition, the processor 110 may initialize the Qubit in the superposition state, and then search the minimum by using the quantum memory 120 and the quantum comparator 130. Hereinafter, a specific method for searching the minimum by the processor 110 according to the present disclosure will be described through FIGS. 2 to 7.

Meanwhile, the quantum memory 120 may be a module corresponding to the classical memory. As an example, the quantum memory 120 may be a quantum random access memory (QRAM). However, the present disclosure is not limited thereto.

In the present disclosure, the quantum memory 120 may return, from a superposition-state index, superposition-state data corresponding to the superposition-state index. Here, the superposition-state index may represent the address of each of the superposition-state data. According to an exemplary embodiment, the quantum memory 120 may have a complexity of $O(\log_2 N)$. Here, O may be a function representing time complexity according to an asymptotic notation. Further, N may represent the number of data. However, the present disclosure is not limited thereto.

Meanwhile, the quantum comparator 130 may compare the superposition-state data with the threshold in parallel.

Specifically, when a quantum algorithm for finding the minimum by Durr and Høyer in the related art is described as an example, the data corresponding to the corresponding index should be first returned through the classical memory in order to comparer the threshold and the data. In addition, after the returned data and the threshold are compared through the classical comparator, a result value should be transmitted to the quantum computer again. However, since the computing device 100 according to the present disclosure utilizes the quantum memory 120, the computing device 100 may return, from the superposition-state index, the superposition-state data corresponding to the superposition-state index. As a result, the quantum comparator 130 may compare the superposition-state data with the threshold in parallel. However, the present disclosure is not limited thereto.

Meanwhile, when a phase of a state in which an index related to data smaller than the threshold is written in a database is inverted, a Grover operator 140 may amplify a probability of the written state. According to an exemplary embodiment, the database may be Oracle®.

Specifically, the Oracle® may be a quantum subroutine that acts on a series of Qubits to return a solution to the phase. The subroutine may be an input for the quantum algorithm that applies a series of quantum operations by receiving the Oracle® in addition to some parameters, and treats a call for the quantum subroutine like a basic gate. In addition, the Grover operator 140 may amplify the probability of the written or returned state. According to an exemplary embodiment, the Grover operator 140 may be amplitude-amplification Oracle®. In this case, the Grover operator 140 may amplify a probability of a state having an amplitude smaller than an average amplitude. However, the present disclosure is not limited thereto. Hereinafter, the Grover operator 140 and the database according to the present disclosure may correspond to the Oracle®, so a description of detailed contents is specifically discussed in "Quantum Minimum Searching Algorithm and Circuit Implementation, DOI: 10.1109" which is a thesis of an inventor of this application, the entire contents of which are incorporated herein by reference.

According to the above-described configuration, the computing device 100 may replace a part comparing the data and the threshold with the quantum memory 120 and the quantum comparator 130 in the algorithm for finding the minimum in the related art. Accordingly, the computing device 100 may search the minimum with lower complexity. Moreover, all processes for searching the minimum while replacing a part of which operation is required in the classical computer with the operation through the quantum circuit through a measurement process in the middle may be modularized into one quantum computer.

Hereinafter, the method for searching the minimum by computing device 100 according to the present disclosure will be described.

FIG. 2 is a flowchart for describing an example of a method for searching a minimum in N data by a computing device according to some exemplary embodiments of the present disclosure.

Referring to FIG. 2, the processor 110 of the computing device 100 may determine a threshold (S110).

As an example, the processor 110 may determine any one of N data as the threshold. As another example, the processor 110 may also determine any value not included in N data as the threshold. As yet another example, the processor 110 may also determine the threshold based on an input from a user. As still yet another example, the processor 110 may also determine the threshold by referring a result of searching the minimum which is previously performed. However, the present disclosure is not limited thereto.

Meanwhile, the processor 110 of the computing device 100 may initialize a Qubit (or memory) to include indexes and thresholds representing addresses in which N (N is a natural number) data are recorded, respectively in a superposition state (S120).

For example, the processor 110 may initialize the Qubit according to the following equation.

$$\psi = \sum_i \frac{1}{\sqrt{N}} |T[i]\rangle |T[y]\rangle \qquad \text{[Equation 1]}$$

Here, $\psi$ may represent the Qubit. In addition, N may represent the number of data. In addition, i may represent the index. In addition, T[i] may represent data corresponding to the index. Further, y may represent the threshold. Further, T[y] may represent data corresponding to the threshold. However, the present disclosure is not limited thereto.

Meanwhile, the quantum memory 120 of the computing device 100 may return, from the superposition-state index, the superposition-state data corresponding to the superposition-state index (S130).

For example, when the quantum memory 120 receives the superposition-state index shown in Equation 2 below, the quantum memory 120 may return the superposition-state data shown in Equation 3 below. However, the present disclosure is not limited thereto.

$$\sum_{i=0}^{N-1} |i\rangle \qquad \text{[Equation 2]}$$

$$\sum_{i=0}^{N-1} |T[i]\rangle \qquad \text{[Equation 3]}$$

Meanwhile, the computing device 100 and the quantum comparator 130 may compare the superposition-state data with the threshold in parallel (S140).

According to an exemplary embodiment of the present disclosure, since the quantum memory 120 may return, from the superposition-state index, the superposition-state data corresponding to the superposition-state index, the quantum comparator 130 may compare the superposition-state data with the threshold in parallel. However, the present disclosure is not limited thereto.

Meanwhile, according to some exemplary embodiments of the present disclosure, the quantum comparator 130 may compare the superposition-state data and the threshold based on whether a carry bit is generated. Here, a carry may mean that a carry occurs in a most significant bit (MSB). That is, in the present disclosure, a meaning that the carrier bit is generated may be a meaning that the carry occurs in the most significant bit. However, the present disclosure is not limited thereto. Hereinafter, a method for comparing the superposition-state data and the threshold based on whether the carry bit is generated by the quantum comparator 130 according to the present disclosure will be described with reference to FIG. 5.

Meanwhile, the processor 110 of the computing device 100 may search the minimum based on a comparison result of comparing the superposition-state data with the threshold in parallel by the quantum comparator 130 (S150).

As an example, when the returned index related data is smaller than the threshold according to the comparison result, the processor 110 may determine the returned index related data as the minimum. However, the present disclosure is not limited thereto.

Meanwhile, according to some exemplary embodiments of the present disclosure, when the returned index related data is larger than the threshold according to the comparison result, the processor 110 may repeatedly perform the minimum searching method. Hereinafter, a method for repeatedly performing the minimum searching method by the processor 110 according to the present disclosure will be described through FIG. 3.

Meanwhile, according to some exemplary embodiments of the present disclosure, the processor 110 of the computing device 100 may repeatedly perform the minimum searching method for a predetermined time $\tau_{th}$. Here, the predetermined time may be a time when a probability that a result which the processor 110 derives among N data will be the minimum is sufficiently high.

Meanwhile, according to some exemplary embodiments of the present disclosure, the predetermined time $\tau_{th}$ may be determined according to Equation 4 below.

$$\tau_{th}=1.25\pi\sqrt{N}+1.4(\log_2 N)^2 \qquad \text{[Equation 4]}$$

Further, N may represent the number of data.

When the processor 110 repeatedly performs the minimum searching method for any time other than the predetermined time $\tau_{th}$, if the time is not sufficient, a probability that the minimum may not be searched among N data may be high. That is, one datum of N data which the processor 110 returns by repeatedly performing the minimum searching method for any time may not be the minimum in N data. On the contrary, when the processor 110 repeatedly performs the minimum searching method even after a time when a probability that the processor 110 will search the minimum among N data is sufficiently high elapsed, resources may be wasted. Accordingly, the processor 110 may repeatedly perform the minimum searching method for the predetermined time $\tau_{th}$. However, the present disclosure is not limited thereto.

According to the above-described configuration, the computing device 100 may return, from the superposition-state index, the superposition-state data corresponding to the superposition-state index. As a result, the computing device 100 may compare the superposition-state data with the threshold in parallel. In this case, the predetermined time $\tau_{th}$ which the computing device 100 requires for searching the minimum may be reduced as compared with the time in the related art. As an example, in the case of the related art using the classical memory, the time required for searching the minimum may be $\tau_{th}=22.5\sqrt{N}+1.4(\log_2 N)^2$. That is, the time in the related art may be longer than the time required for searching the minimum by the computing device 100 according to the present disclosure.

Meanwhile, according to some exemplary embodiments of the present disclosure, the computing device 100 may search the minimum based on a comparison result of comparing the superposition-state data and the threshold in parallel. Hereinafter, a method for searching the minimum based on the comparison result by the computing device 100 according to the present disclosure will be described with reference to FIG. 3.

Figure 3:
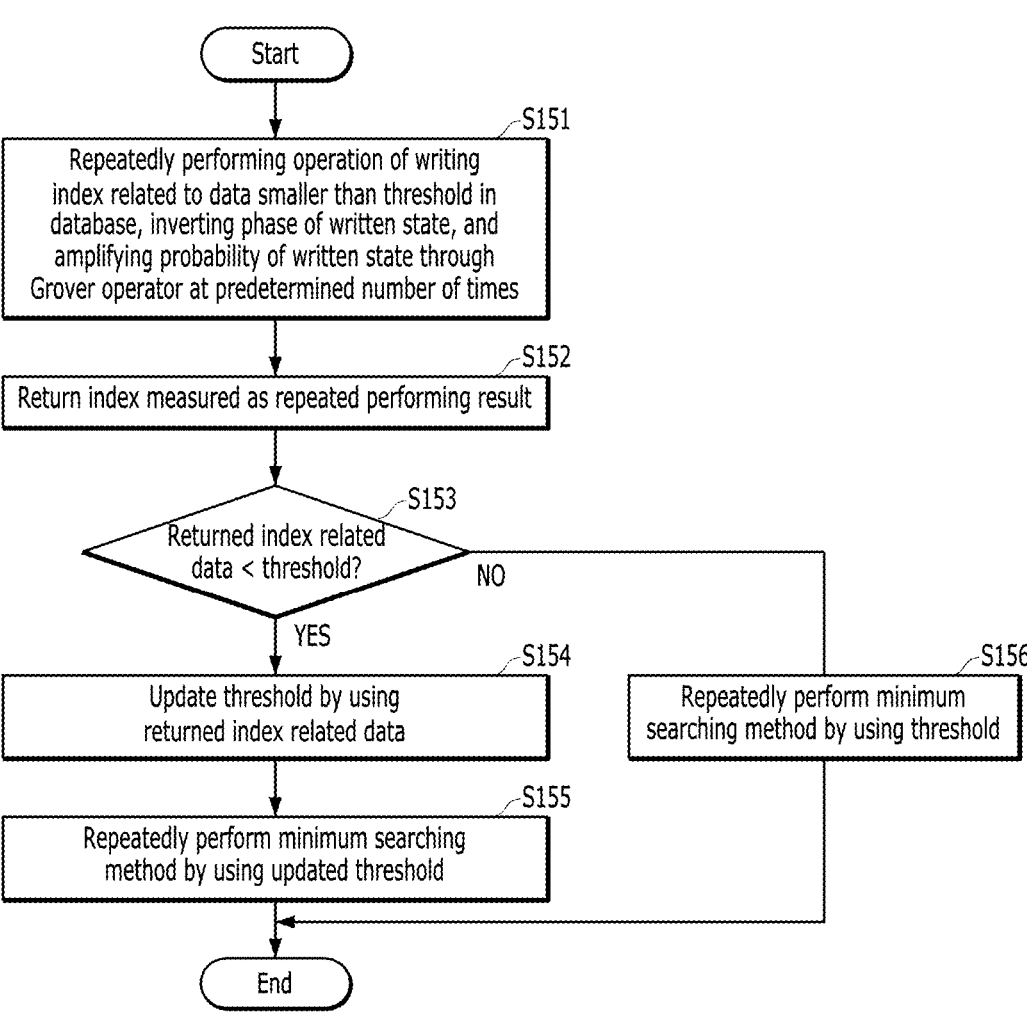
FIG. 3 is a flowchart for describing an example of a method for searching a minimum based on a comparison result by a computing device according to some exemplary embodiments of the present disclosure.

FIG. 3 is a flowchart for describing an example of a method for searching a minimum based on a comparison result by a computing device according to some exemplary embodiments of the present disclosure.

Referring to FIG. 3, the computing device 100 may write an index related to data smaller than the threshold in the database, and invert a phase in a written state. In addition, the computing device 100 may repeatedly perform an operation of amplifying a probability of the written state at a predetermined number of times through the Grover operator 140 (S151). Here, the predetermined number of times may be the number of times determined in order to increase the probability of the written state to the maximum.

As an example, the predetermined number of times may be determined according to the following equation.

$$O(\sqrt{N}) \qquad \text{[Equation 5]}$$

Here, O may be a function representing time complexity according to an asymptotic notation. However, the present disclosure is not limited thereto.

In the case of a classical random algorithm in the related art, the number of times of amplifying the probability may be O(N). This as the number of times corresponding to N data may be, i.e., the maximum number of repetition times when there are N data. On the contrary, according to the present disclosure, the processor 110 may repeatedly perform step S151 at the number of times of $O(\sqrt{N})$ which is the number of times smaller than the maximum number of repetition times. However, the present disclosure is not limited thereto.

Meanwhile, the processor 110 of the computing device 100 may return an index measured as a repeated performing result (S152). Here, a meaning that the processor 110 returns the index may be a meaning of observing the state of the Qubit. In other words, the meaning may be a meaning that at least one of the index or the data is determined. However, the present disclosure is not limited thereto.

Meanwhile, when the returned index related data is smaller than the threshold (Yes in S153), the processor 110 of the computing device 100 may update the threshold by using the returned index related data (S154). In addition, the processor 110 may repeatedly perform the minimum searching method by using the updated threshold (S155).

According to an exemplary embodiment, the processor 110 may initialize a Qubit to include indexes representing addresses in which N data are recorded, respectively, and updated thresholds in a superposition state. In addition, the processor 110 may repeatedly perform steps S130, S140, S151, S152, and S153. However, the present disclosure is not limited thereto.

Meanwhile, when the returned index related data is larger than the threshold (No in S153), the processor 110 of the computing device 100 may repeatedly perform the minimum searching method by using the threshold (S156).

According to an exemplary embodiment, the processor 110 may initialize a Qubit to include indexes representing addresses in which N data are recorded, respectively, and thresholds which are not updated in a superposition state. In addition, the processor 110 may repeatedly perform steps S130, S140, S151, S152, and S153. Alternatively, the processor 110 may repeatedly perform steps S130, S140, S151, S152, and S153 without performing step S120.

Meanwhile, according to steps S155 and S156 described above, the processor 110 of the computing device 100 may also perform the minimum searching method infinitely. Accordingly, the processor 110 may repeatedly perform the minimum searching method only for a predetermined time $\tau_{th}$.

Specifically, the processor 110 may recognize whether the predetermined time $\tau_{th}$ elapsed while performing the minimum searching method.

As an example, when any one of steps S120 to S150 is performed, the processor 110 may recognize whether the predetermined time $\tau_{th}$ elapsed. As another example, when any one of steps S151 to S156 is performed, the processor 110 may recognize whether the predetermined time $\tau_{th}$ elapsed. In addition, the processor 110 may repeatedly perform the minimum searching method when recognizing that the predetermined time $\tau_{th}$ did not elapse. Alternatively, the processor 110 may return the measured index when recognizing that the predetermined time $\tau_{th}$ elapsed. In addition, the processor 110 may determine the minimum based on the returned index. Hereinafter, a method for determining the minimum based on the returned index by the computing device 100 according to the present disclosure will be described with reference to FIG. 4.

Figure 4:
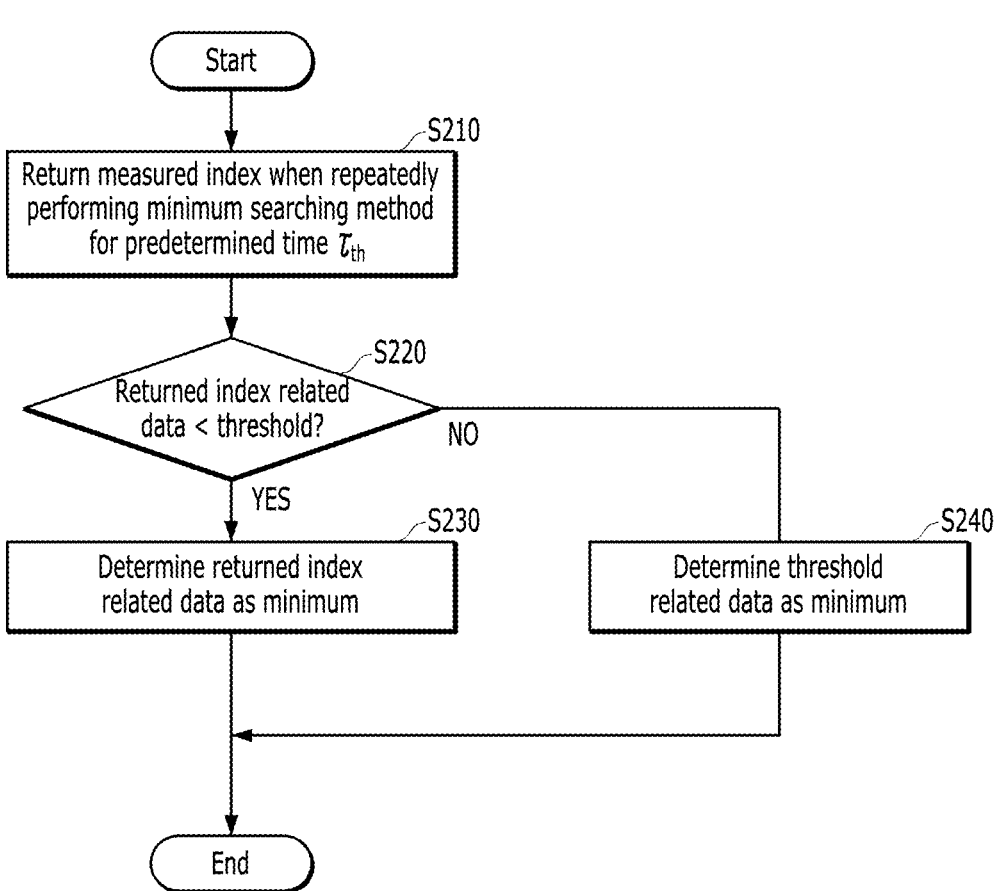
FIG. 4 is a flowchart for describing an example of a method for determining a minimum based on a returned index by a computing device 100 according to some exemplary embodiments of the present disclosure.

FIG. 4 is a flowchart for describing an example of a method for determining a minimum based on a returned index by a computing device 100 according to some exemplary embodiments of the present disclosure.

Referring to FIG. 4, the processor 110 of the computing device 100 may return the measured index when repeatedly performing the minimum searching method for a predetermined time $\tau_{th}$ (S210). Here, a meaning that the processor 110 returns the index may be a meaning of observing the state of the Qubit. In other words, the meaning may be a meaning that at least one of the index or the data is determined. However, the present disclosure is not limited thereto.

Meanwhile, when the returned index related data is smaller than the threshold (Yes in S220), the processor 110 of the computing device 100 may determine the returned index related data as the minimum (S230).

In other words, the processor 110 may determine, as the minimum, the returned index related data by the observation of the state or the returned data by the observation of the state. However, the present disclosure is not limited thereto.

Meanwhile, when the returned index related data is larger than the threshold (No in S220), the processor 110 of the computing device 100 may determine threshold related data as the minimum (S240).

In other words, the processor 110 may determine, as the minimum, the returned threshold related data by the observation of the state. However, the present disclosure is not limited thereto.

According to the above-described configuration, the processor 110 of the computing device 100 may return the measured index when repeatedly performing the minimum searching method for a predetermined time $\tau_{th}$. In addition, the processor 110 may determine the minimum based on the returned index and the minimum may be a smallest value among N data.

Meanwhile, according to some exemplary embodiments of the present disclosure, the computing device 100 may compare the superposition-state data and the threshold in parallel based on whether the carry bit is generated. Hereinafter, a method for comparing the superposition-state data with the threshold in parallel by the computing device 100 according to the present disclosure will be described with reference to FIG. 5.

FIG. 5 is a flowchart for describing an example of a method for comparing data of a superimposed state with a threshold in parallel by a computing device according to some exemplary embodiments of the present disclosure.

Referring to FIG. 5, the computing device 100 may recognize whether the carry bit is generated by performing an addition operation of the threshold and a complement of the superposition-state data through the quantum comparator 130 (S141). However, the operation performed by the quantum comparator 130 is not limited to the addition operation, but may be a subtraction operation.

Specifically, the quantum comparator 130 may acquire the complement of the superposition-state data returned through the quantum memory 120. According to an exemplary embodiment, the quantum comparator 130 may acquire the complement of the superposition-state data by using a complementation method of 1. Here, the complementation method of 1 may be a method for acquiring the complement by subtracting a given binary number from a number in which each digit value is all for inverting the bit. For example, when a number "2" is represented by a binary system, the number "2" may be expressed as "010" and in this case, the complement may be "101". When acquiring the complement of the superposition-state data, the processor 110 may recognize whether the carry bit is generated by performing the addition operation of the complement and the threshold. Here, the carry may mean that the carry occurs in the most significant bit. That is, in the present disclosure, a meaning that the carrier bit is generated may be a meaning that the carry occurs in the most significant bit. However, the present disclosure is not limited thereto.

Meanwhile, according to some exemplary embodiments of the present disclosure, the computing device 100 may also recognize whether the carry bit is generated by performing the addition operation of the complement of the threshold and the superposition-state data through the quantum comparator 130.

Meanwhile, the processor 110 of the computing device 100 may compare sizes of the superposition-state data and the threshold based on whether the carry bit is generated.

As an example, when the processor 110 recognizes that the carry bit is generated (Yes in S142), the processor 110 may recognize that the threshold is larger than the superposition-state data (S143).

For example, it is assumed that the threshold is "4" and the superposition-state data "2". In this case, if "complement of 4+2" is expressed by the binary system, "complement of 4+2" may be expressed as "$(100)_2+(010)_2$)". Further, since the complement of "010" is "101", "$(100)_2+((010)_2)$" may be expressed as "$(100)_2+((101)_2)$". As a result, when an operation of "$(100)_2+((101)_2)$" is performed, a value of "$(1001)_2$" may be derived. Here, a carry of 1 which occurs in the most significant bit may be the carry. In this case, since the processor 110 recognizes that the carry bit is generated, the processor 110 may recognize that "4" as the threshold is larger than "2" as the superposition-state data. However, the present disclosure is not limited thereto.

Meanwhile, when the processor 110 recognizes that the carry bit is not generated (No in S142), the processor 110 may recognize that the superposition-state data is larger than the threshold (S144).

For example, it is assumed that the threshold is "4" and the superposition-state data "6". In this case, if "complement of 4+6" is expressed by the binary system, "complement of 4+6" may be expressed as "$(100)_2+(110)_2$". Further, since the complement of "110" is "001", "$(100)_2+((110)_2)$" may be expressed as "$(100)_2+((001)_2)$". As a result, when an operation of "$(100)_2+((001)_2)$" is performed, a value of "$(0101)_2$" may be derived. In this case, the processor 110 may recognize that the carry bit is not generated. Accordingly, the processor 110 may recognize that "6" as the superposition-state data is larger than "4" as the threshold. However, the present disclosure is not limited thereto.

According to the above-described configuration, the computing device 100 may compare the sizes of the superposition-state data and the threshold based on whether the carry bit is generated by performing the addition operation of the threshold and the complement of the superposition-state data through the quantum comparator 130. A quantum constant adder presented in a thesis "Thomas Haner, Martin Roetteler, Krysta M. Svore "Factoring using 2n+2 qubits with toffoli based modular multiplication", arXiv: 1611.07995v2, June 2017" in the related art may perform an addition operation r=c+b of n-bit constant, c and variable and return only a most significant bit (carry bit) y of r. More specifically, the quantum constant adder in the related art may constitute a circuit by adding a CNOT gate and a NOT gate only when each digit of c is 1, and use n−1 is auxiliary Qubits g. On the contrary, according to the present disclosure, by considering that the carry bit is not generated when a subtraction of two numbers is a negative number in the complementation method of 1, an adder of variables a and b may be converted into a comparator. However, the present disclosure is not limited thereto.

Figure 6:
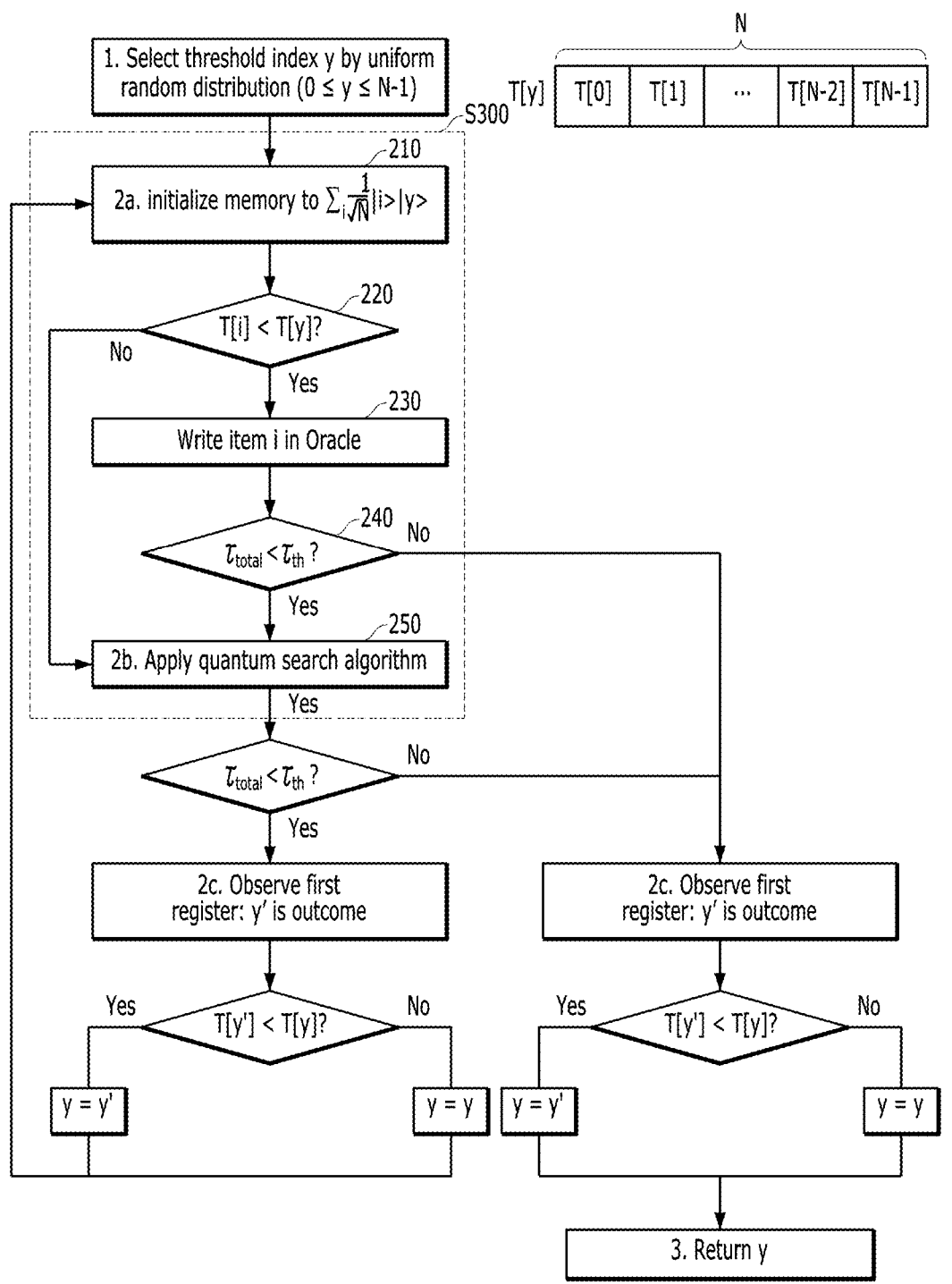
FIG. 6 is a flowchart for describing a minimum search algorithm in related art using a classical memory.
Figure 7:
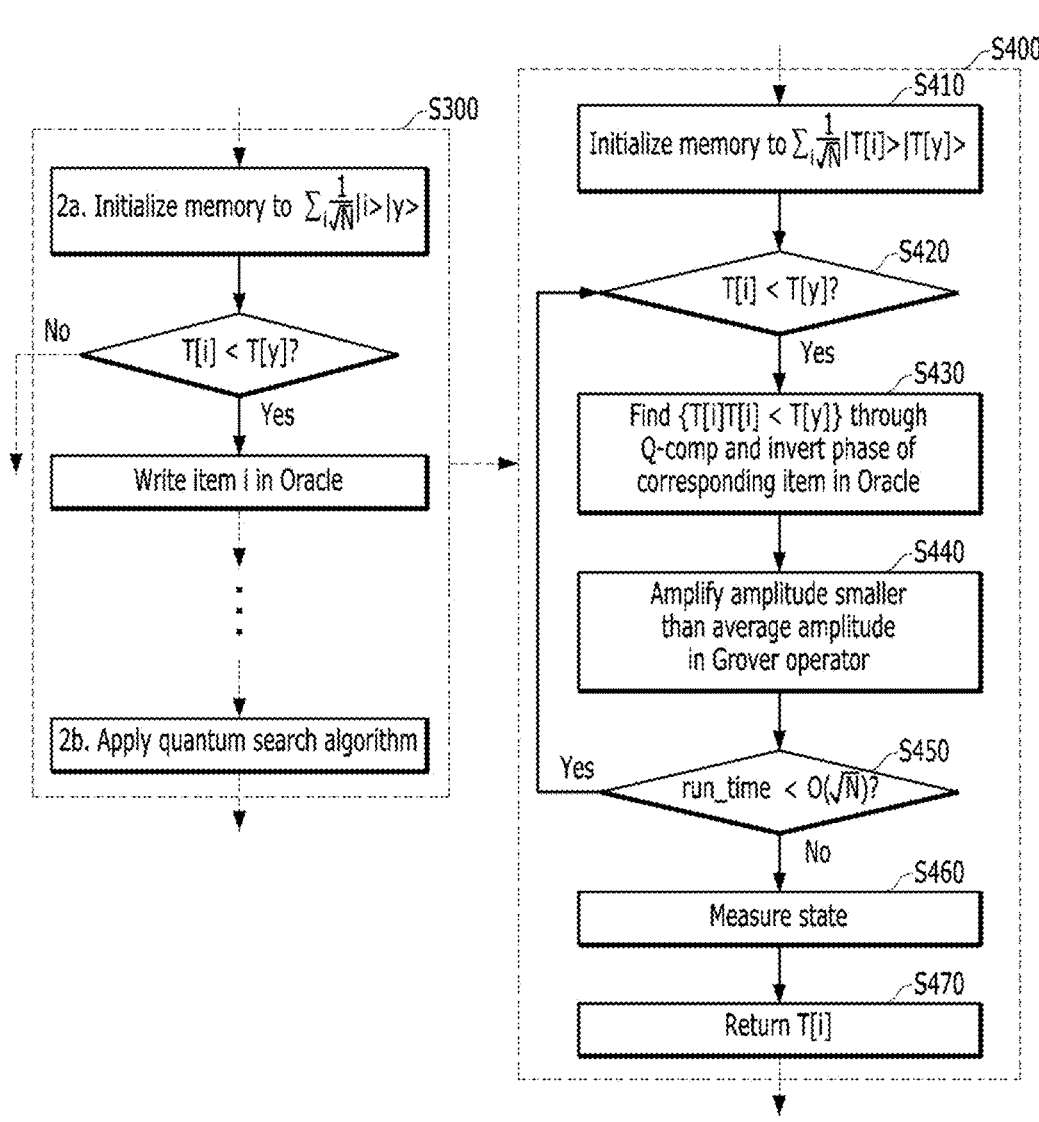
FIG. 7 is a flowchart for describing an example of a method for searching a minimum using another quantum memory according to some exemplary embodiments of the present disclosure.

FIG. 6 is a flowchart for describing a minimum search algorithm in related art using a classical memory. FIG. 7 is a flowchart for describing an example of a method for searching a minimum using another quantum memory according to some exemplary embodiments of the present disclosure.

In the quantum algorithm for finding the minimum in the related art proposed by Durr and Høyer requires the classical memory and the classical comparator in order to compare the threshold and the data. As an example, referring to FIG. 5, the algorithm for finding the minimum in the related art may require the classical memory and the classical comparator in step S300.

Specifically, in the algorithm for finding the minimum in the related art, the data corresponding to the index may be first returned through the classical memory in order to perform an operation of comparing the threshold and the data. In addition, a result of comparing the threshold by using the returned data may be transmitted to the quantum computer.

On the contrary, in the present disclosure, a part requiring the classical memory may be performed through the quantum memory 120. Specifically, referring to FIG. 7, the computing device 100 may perform step S400 by using the quantum memory 120 as the interface.

According to an exemplary embodiment, the processor 110 of the computing device 100 may initialize the memory (or Qubit) to include indexes representing addresses in which N (N is a natural number) data are recorded, respectively, and thresholds in a superposition state (S410). In addition, the computing device 100 may return, from the superposition-state index, the superposition-state data corresponding to the superposition-state index by using the quantum memory 120 as the interface. In this case, the processor 110 of the computing device 100 may determine whether the data is larger than the threshold (S420).

According to an exemplary embodiment, the computing device 100 compares the superposition-state data with the threshold in parallel through the quantum comparator 130 to find the superposition-state data smaller than the threshold, and invert an index related to the data smaller than the threshold or the phase of the data in the database (or Oracle®) (S430).

Meanwhile, the Grover operator 140 of the computing device 100 may amplify a probability of a state having an amplitude smaller than an average amplitude (S440). According to an exemplary embodiment, the Grover operator 140 may repeatedly perform an operation for amplifying the probability of the state at $O(\sqrt{N})$ times as a predetermined number of times.

Meanwhile, when the processor 110 of the computing device 100 repeatedly performs the operation for amplifying the probability of the state at the predetermined number of times through the Grover operator 140 (No in S450), the processor 110 may measure a state of the index or data measured as the repeated performing result (S460). In addition, the processor 110 of the computing device 100 may return the index or the data measured as the repeated performing result (S470).

According to the above-described configuration, the computing device 100 according to the present disclosure replaces the existing scheme requiring the classical comparator and the RAM with the quantum comparator 130 and the quantum memory 120 to reduce the complexity and enable modularization. Moreover, the method for searching the minimum according to the present disclosure may be performed within a predetermined time $(\tau_{th}=22.5\sqrt{N}+1.4(\log_2 N)^2)$. The reason is that the superposition-state data may be called from the superposition-state index by using the quantum memory 120 as the interface. On the contrary, the algorithm for finding the minimum in the related art should be able to be performed for a time) $(\tau_{th}=22.5\sqrt{N}+1.4(\log_2 N)^2)$ longer than the predetermined time according to the present disclosure. Since it is difficult to use the quantum memory 120 and the quantum comparator 130 in the algorithm for finding the minimum in the related art, such a difference may occur as the classical comparator and the RAM are used.

Figure 8:
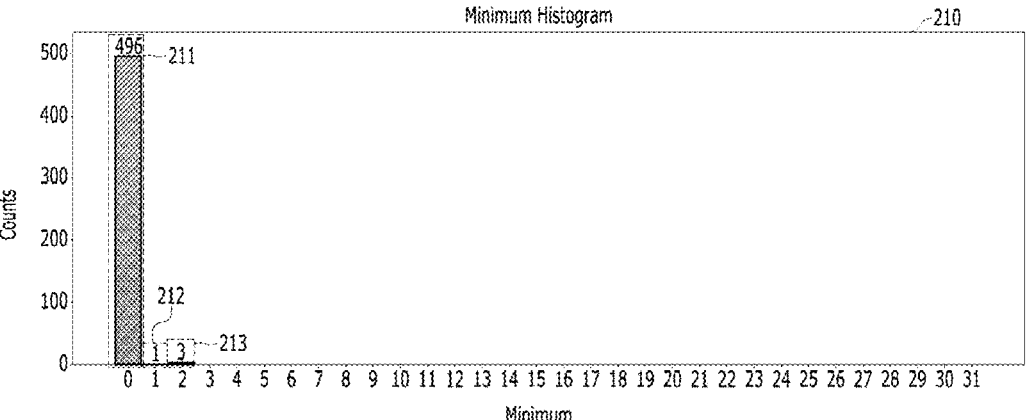
FIG. 8 is a diagram for describing result data of searching a minimum through a method for searching a minimum according to some exemplary embodiments of the present disclosure.

FIG. 8 is a diagram for describing result data of searching a minimum through a method for searching a minimum according to some exemplary embodiments of the present disclosure. An x axis of a histogram 220 illustrated in FIG. 8 may indicate a value of data and a y axis may indicate the number of times at which each data is searched as the minimum. In addition, the histogram 220 illustrated in FIG. 8 may be a histogram for a 5-Qubit simulation result.

Referring to a table 210, the total number of trials of the minimum searching method according to the present disclosure may be 500. In the present disclosure, the minimum searching method may be performed 500 times while changing the threshold to a random size.

An expected number of iterations (or expected iteration time) may be 57. Specifically, the number of data used in this experiment may be 32 (0 to 31). In this case, according to the predetermined time $(\tau_{th}=1.25\pi\sqrt{32}+1.4(\log_2 32)^2)$ according to an exemplary embodiment, the expected number of iterations may be 57.

According to an experimental result, a failure rate (%) may be 0.8%.

Specifically, referring to the histogram 220, the number of times 211 at which data having a size of 0 is determined as the minimum among data having sizes of 0 to 31 (in this experiment, it is assumed that the index value corresponds to the data (i=T[i])) may be 496. In addition, the number of times 212 at which the data having the size of 1 is determined as the minimum may be 1. In addition, the number of times 213 at which the data having the size of 2 is determined as the minimum may be 3. In overall, a failure rate at which the minimum may not be searched and minimum searching is unsuccessful may be 0.8%.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A processor-implemented method for searching a minimum in N (N being a natural number) pieces of data, the method comprising:

determining a threshold;

initializing Qubits into a superposition state of indexes representing addresses in which each of the N pieces of data are recorded, and the threshold, which yields superposition-state data;

returning, from a superposition-state index, the superposition-state data corresponding to the superposition-state index through a quantum memory comprising a quantum random access memory (QRAM);

comparing the superposition-state data with the threshold in parallel through a quantum comparator (Q-comp) and the QRAM; and searching the minimum based on the comparison result, wherein the searching of the minimum based on the comparison result comprises:

repeatedly performing an operation of writing an index related to data smaller than the threshold in a database, inverting a phase of a written state, and amplifying a probability of the written state through a Grover operator at a predetermined number of times;

returning an index measured as the repeated performing result;

updating the threshold by using the returned index related data when the returned index related data is smaller than the threshold;

repeatedly performing the minimum searching method by using the updated threshold; and repeatedly performing the minimum searching method for a predetermined time $\tau_{th}$;

returning the measured index when repeatedly performing the minimum searching method for the predetermined time $\tau_{th}$; and determining the returned index related data as the minimum when the returned index related data is smaller than the threshold, wherein a quantum circuit is used to modularize the searching of the minimum into one computing device.

2. The method of claim 1, wherein the searching the minimum based on the comparison result comprises:

repeatedly performing an operation of writing an index related to data smaller than the threshold in a database, inverting a phase of a written state, and amplifying a probability of the written state through a Grover operator at a predetermined number of times;

returning an index measured as the repeated performing result; and repeatedly performing the minimum searching method by using the threshold when the returned index related data is larger than the threshold.

3. The method of claim 2, further comprising:

repeatedly performing the minimum searching method for a predetermined time $\tau_{th}$.

4. The method of claim 1, wherein the predetermined time $\tau_{th}$ is determined according to an equation $\tau_{th}=1.25\pi\sqrt{N}+1.4(\log_2 N)^2$.

5. The method of claim 1, further comprising:

returning the measured index when repeatedly performing the minimum searching method for the predetermined time $\tau_{th}$; and determining the threshold related data as the minimum when the returned index related data is larger than the threshold.

6. The method of claim 3, wherein the predetermined time $\tau_{th}$ is determined according to an equation $\tau_{th}=1.25\pi\sqrt{N}+1.4(\log_2 N)^2$.

7. The method of claim 3, further comprising:

returning the measured index when repeatedly performing the minimum searching method for the predetermined time $\tau_{th}$; and determining the returned index related data as the minimum when the returned index related data is smaller than the threshold.

8. The method of claim 3, further comprising:

returning the measured index when repeatedly performing the minimum searching method for the predetermined time $\tau_{th}$; and determining the threshold related data as the minimum when the returned index related data is larger than the threshold.

9. The method of claim 1, wherein the determining a threshold includes determining any one of the N pieces of data as the threshold.

10. The method of claim 1, wherein the predetermined number of times is determined according to an equation $O(\sqrt{N})$, and wherein the O is a function representing time complexity according to an asymptotic notation.

11. The method of claim 2, wherein the predetermined number of times is determined according to an equation $O(\sqrt{N})$, and wherein the O is a function representing time complexity according to an asymptotic notation.

12. The method of claim 1, wherein the repeatedly performing an operation of writing an index related to data smaller than the threshold in a database, inverting a phase of a written state, and amplifying a probability of the written state through a Grover operator at a predetermined number of times, based on the comparison result includes, amplifying a probability of a state having an amplitude smaller than an average amplitude.

13. The method of claim 2, wherein the repeatedly performing an operation of writing an index related to data smaller than the threshold in a database, inverting a phase of a written state, and amplifying a probability of the written state through a Grover operator at a predetermined number of times, based on the comparison result includes, amplifying a probability of a state having an amplitude smaller than an average amplitude.

14. The method of claim 1, wherein the comparing the superposition-state data with the threshold in parallel through a quantum comparator (Q-comp) comprises:

recognizing whether a carry bit is generated by performing an addition operation of the threshold and a complement of the superposition-state data; and comparing sizes of the superposition-state data and the threshold based on whether the carry bit is generated.

15. The method of claim 14, wherein the comparing sizes of the superposition-state data and the threshold based on whether the carry bit is generated comprises:

recognizing that the threshold is larger than the superposition-state data when it is recognized that the carry bit is generated.

16. The method of claim 14, wherein the comparing sizes of the superposition-state data and the threshold based on whether the carry bit is generated comprises:

recognizing that the superposition-state data is larger than the threshold when it is recognized that the carry bit is not generated.

* * * * *